May 21, 1935.    E. A. JOHNSTON    2,002,473
COMBINED GRAIN AND TRANSPORT WHEEL FOR HARVESTER THRESHERS
Filed Sept. 13, 1926    2 Sheets-Sheet 1

Inventor:
Edward A. Johnston,
By
Atty.

May 21, 1935. E. A. JOHNSTON 2,002,473
COMBINED GRAIN AND TRANSPORT WHEEL FOR HARVESTER THRESHERS
Filed Sept. 13, 1926 2 Sheets-Sheet 2
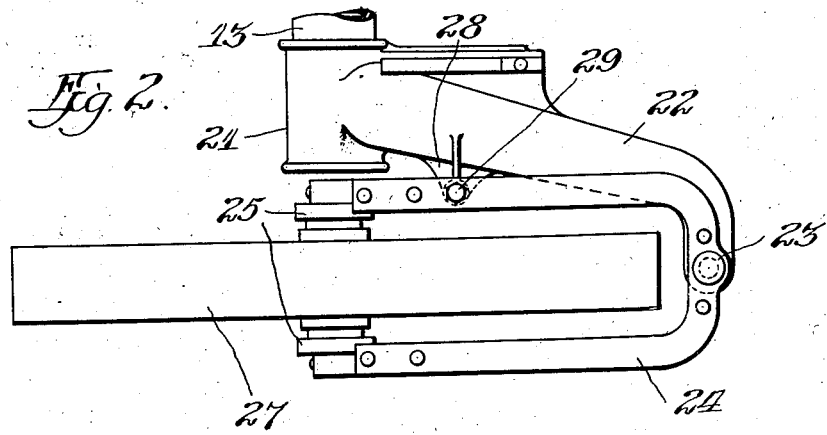
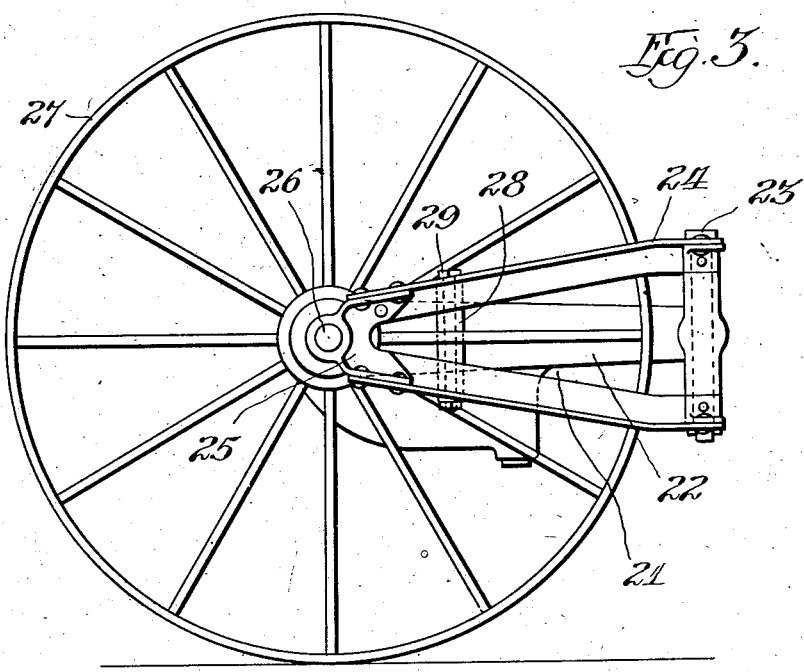
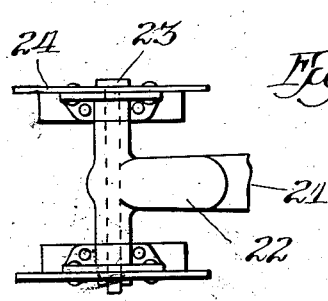
Inventor:
Edward A. Johnston,
By H. P. Doolittle
Atty.

Patented May 21, 1935

2,002,473

UNITED STATES PATENT OFFICE 2,002,473

COMBINED GRAIN AND TRANSPORT WHEEL FOR HARVESTER THRESHERS

Edward A. Johnston, Chicago, Ill., assignor to International Harvester Company, a corporation of New Jersey Application September 13, 1926, Serial No. 134,992

4 Claims. (Cl. 56—122)

This invention relates to harvester threshers and particularly to a combined grain and transport wheel for such machines. As is well known in this art, these machines comprise a rigid main frame carried on an axle and a pair of wheels, which frame supports the grain separating mechanism or the thresher. Laterally offset from the main frame is the harvester part which includes a supporting axle hingedly and foldingly connected to the main frame or to the thresher axle. This harvester axle is hingedly connected for movement in a vertical plane to accommodate the harvester part floatingly to declivities in the field. It is foldingly connected so that it may be swung back in a horizontal plane with the harvester which it supports for the purpose of narrowing materially the width of the machine so that it may more easily be transported through gateways and across narrow highways.

While it is quite common at the present time to provide harvester threshers with this folding feature, nevertheless the task of accomplishing this result is rather awkward because it necessitates the use of two wheels, one for supporting the harvester in its normal cutting position, which may be called the grain wheel, and a second, or what may be termed a trailing caster wheel for supporting the harvester in folded position when it is being transported.

The main object of this invention is to simplify this folding operation and to provide a less expensive means for accomplishing this advantageous result.

Briefly this object is accomplished by providing a single wheel for supporting the grainward or outer end of the harvester axle, which wheel in the normal cutting position of the harvester is so connected that it will function as a rigid grain wheel; and, when the harvester is in its folded position, through its connections mentioned, may be turned through an angle of 90 degrees and function as a freely castering transport wheel.

Looking now to the drawings wherein an illustrative embodiment of this invention has been shown and wherein like characters of reference denote like parts throughout the several views, it will be seen that:

Figure 2 is an enlarged plan view of the free or grainward end of the harvester axle showing the manner of connection of the improved wheel support thereto;

Figure 3 is a side elevational view of the structure shown in Figure 2; and

Figure 4 is a front detail view.

Figure 1:
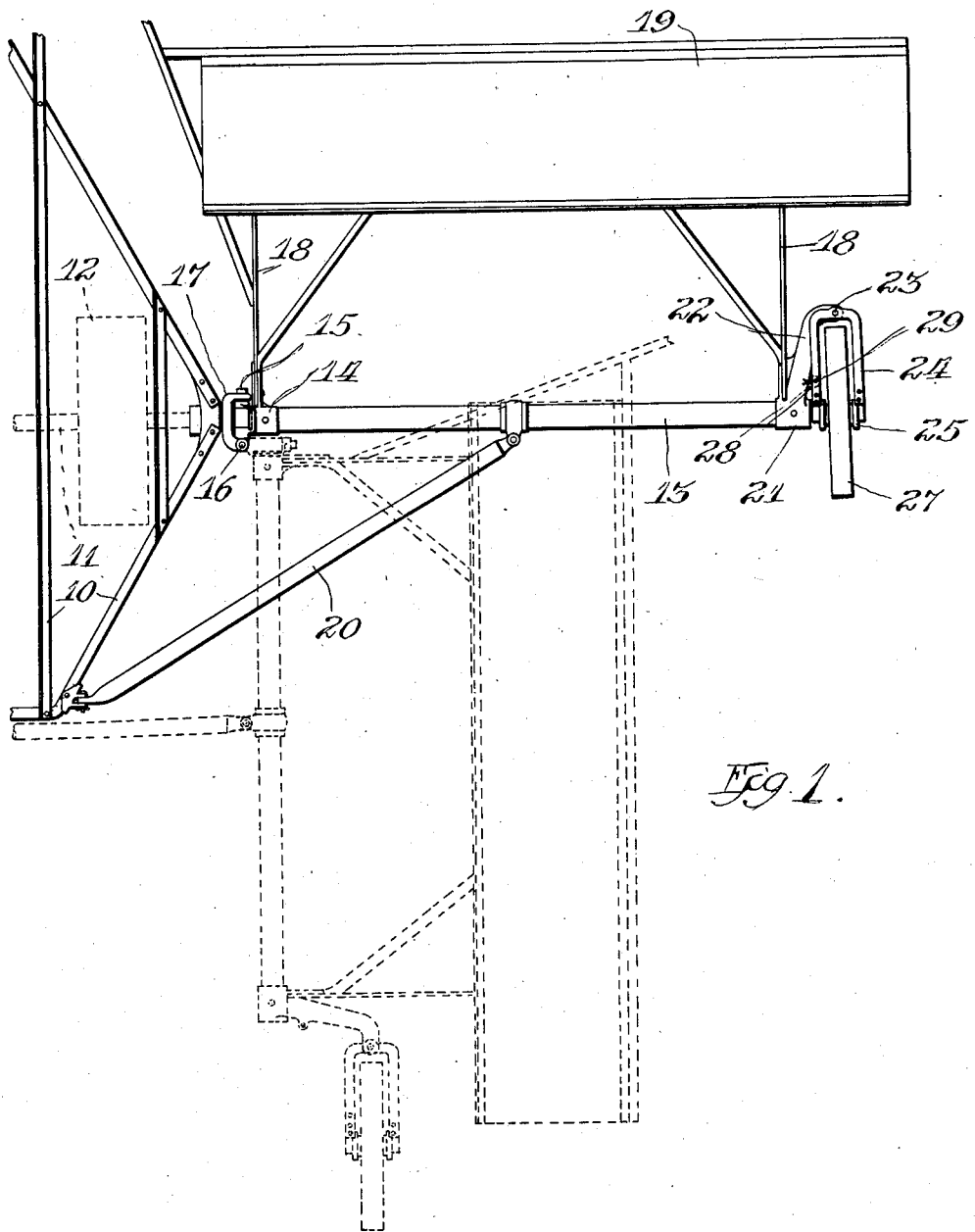
Figure 1 is a plan view showing a fragment of a harvester thresher main frame with a harvester part hingedly and foldingly connected thereto, in combination with the improvement of this invention.

Only a fragment of the thresher part of this machine has been illustrated and it is thought such illustration is sufficient because these machines are well known in the art. So much of the harvester thresher main frame is indicated by the numeral 10 and it will be seen that the same is supported on a thresher axle section 11 journaled in a supporting wheel 12. Extending laterally and substantially in line with the thresher axle 11 the thresher frame 10 has connected thereto a harvester axle 13. This axle 13 carries a bracket 14 at its inner end which is formed with a horizontal pivot pin 15. This pin 15 in turn is connected to a vertical pivot pin 16 formed in a bracket 17 connected in any suitable manner to the thresher part of the machine. It will thus be seen that the horizontal pin 15 permits a free vertical floating action of the axle 13 so that the same may accommodate itself automatically to ground irregularities. The vertical pin 16 permits rearward folding of the axle 13, as shown in Figure 1 in the dotted lines, so that the machine may be narrowed in width for transportation through narrow places, as will be understood.

The axle 13 by means of the forwardly extending bars 18 carries the usual cutting platform 19 forming the harvester part of the machine. When the axle 13 is folded rearwardly the harvester, of course, is also swung around with it, as will be understood. For the purpose of bracing the harvester part when the machine is cutting, there is provided a diagonally disposed brace arm 20 connected to the axle 13 intermediately of its ends, as seen in Figure 1, and to the thresher main frame 10.

For supporting the grainward or outer end of the axle 13 in both its normal cutting position and in its rearwardly folded position, a novel supporting means has been provided, which will now be described.

As shown particularly well in Figure 2, the free end of the axle 13 has fast thereon a bracket 21 embodying a forwardly and diagonally outwardly extending arm 22. Pivotally connected by a bolt 23 to the arm 22 there is a rearwardly extending yoke 24, which yoke at its rear end terminates in a bracket 25 in which is journaled a stub shaft 26 on which is carried a wheel 27. It will be noted that the axis of the wheel 27 is normally in line with the axis of the axle 13.

In the normal cutting position of the harvester part, that is when it is laterally offset from the main frame 10 as shown in the full line position in Figure 1, it is desirable that the yoke 24 be rigidly mounted. Some means must thus be provided to make the pivotal connection 23 inoperative. This is accomplished by providing the arm 22 with a grainwardly extending apertured boss 28. Holes are passed through the upper and lower portions forming the yoke 24, as shown in Figure 3, which holes are aligned with the aperture in the boss 28 so that a bolt 29 may be passed through all of these holes rigidly to secure the yoke 24 to the arm 22. In this manner the wheel support 27 functions as the usual grain wheel when operating in the field.

This same wheel support 27, as heretofore stated, may function as a free trailing caster wheel when the harvester part has been folded rearwardly for transport purposes. Folding of the harvester part is accomplished by disconnecting the left hand end of the diagonal brace 20 thereby permitting rearward folding of the axle 13 on the vertical pin 16 to the position shown in dotted lines in Figure 1. But first the bolt 29 must be removed to disconnect the yoke 24 from the arm 22 so that as the axle 13 is folded backwardly the yoke 24 is free to swing out through an arc of 90 degrees to the dotted line position shown in Figure 1. The left hand end of the member 20, after the harvester part has been folded straight back, is made fast to any suitable part of the thresher to brace the axle 13 in its folded position, as will be understood. If the machine is now transported, the wheel support 27 will freely caster about its pivot 23, as will be understood.

The details of construction as described included the manner of use and operation of this invention and a detailed description of such use and operation will, therefore, be unnecessary. It is to be understood that only an illustrative embodiment of this invention has been illustrated and described and that the same undoubtedly is susceptible of change and modification. It is the intention to cover all such modifications which do not depart from the spirit and scope of this invention as indicated in the appended claims.

What is claimed is:

1. In a machine of the class described, a main frame, a harvester including an axle laterally offset from the main frame and foldingly connected thereto for rearward and horizontal folding, an arm on the free end of the axle, a yoke pivoted to the arm, a wheel carried in said yoke, means for preventing pivotal movement of the yoke when the harvester is in its normal offset position, and means for causing pivotal movement of said yoke when the harvester is in its folded position.

2. In a machine of the class described, a main frame, a harvester including an axle laterally offset from the main frame and foldingly connected thereto, an arm on the free end of the axle, a yoke pivoted to the arm, a wheel carried in said yoke, means for securing the yoke to said arm to prevent pivotal movement of the yoke when the harvester is in its normal offset position, said means being disconnectible to permit a free pivotal movement of the yoke when the harvester and axle are in folded position.

3. In a harvester thresher, a wheel carried longitudinal thresher part, a harvester part including an axle pivotally associated with the thresher part for folding movement rearwardly and horizontally from a normal transverse cutting position to a transport position longitudinally disposed alongside the thresher part, a wheel supporting the outer free end of the axle, means for swingably associating the wheel with the axle in the transverse cutting position of the harvester part whereby the axis of the axle and said wheel are coaxial, said means including a latch for making the wheel non-swingable in the cutting position of the harvester part, said latch being disconnectible to enable the wheel to swing casterwise relative to the axle when the harvester part is folded.

4. In a machine of the class described, a main frame, a harvester including an axle laterally offset from the main frame and foldingly connected thereto, an arm on the free end of the axle, a yoke pivoted to the arm, a wheel carried in said yoke, said wheel having its axis coaxial with the axis of said axle when the latter is in its unfolded position, means for connecting the yoke to said arm to prevent pivotal movement of the yoke when the harvester is in its normal offset position, said means being disconnectible whereby the yoke and wheel may have free pivotal castering movement when the axle and harvester are in the folded position.

EDWARD A. JOHNSTON.